United States Patent Office 3,709,733
Patented Jan. 9, 1973

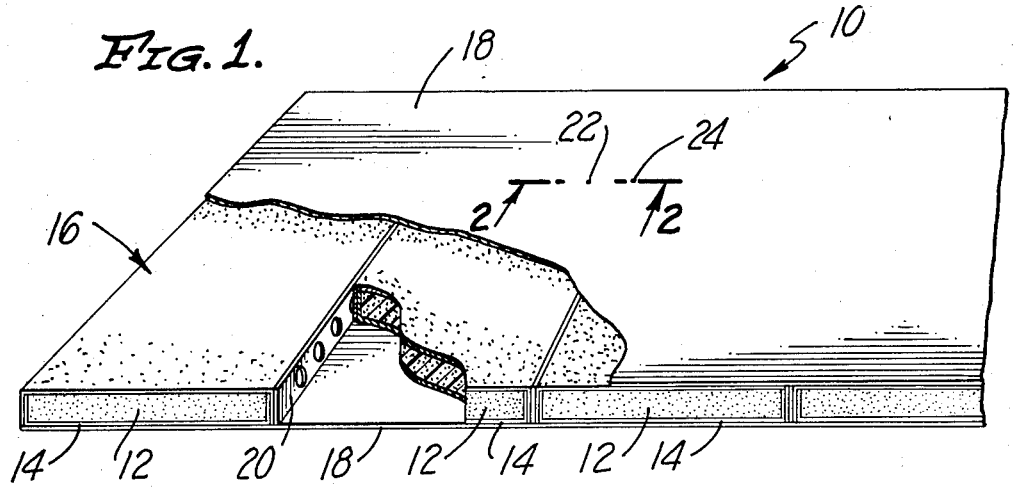
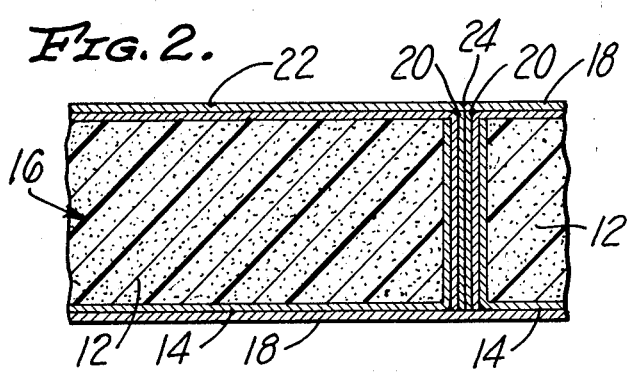
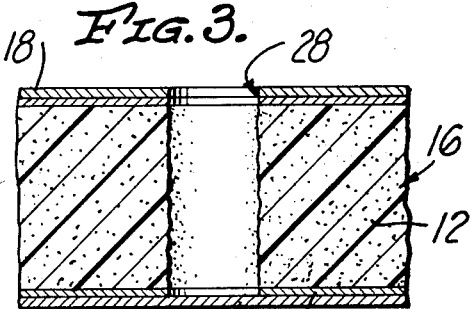
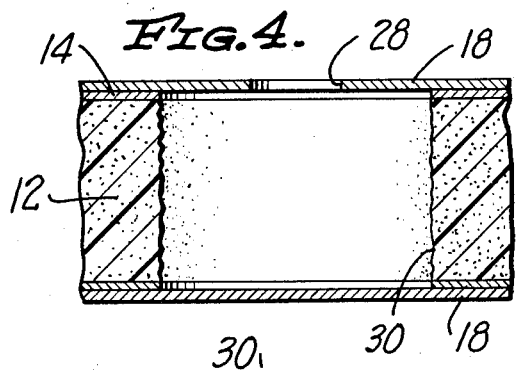
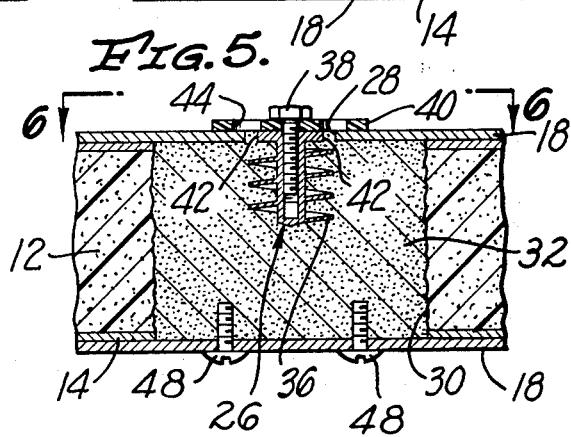
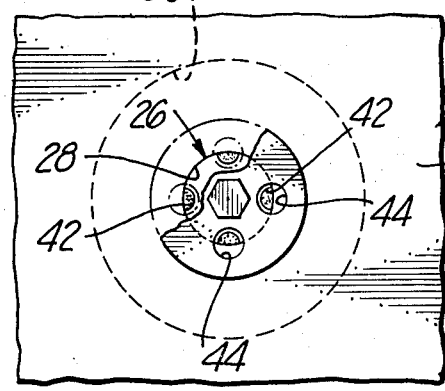

3,709,733
COMPOSITE PANEL STRUCTURE HAVING MOUNTING INSERTS THEREIN
Steven E. Mautner, Beverly Hills, Calif., assignor to Craig Systems Corporation, Lawrence, Mass.
Filed June 26, 1970, Ser. No. 50,045
Int. Cl. E04c 2/10, 2/26
U.S. Cl. 161—37                    1 Claim

ABSTRACT OF THE DISCLOSURE

A composite panel structure comprising rigid foam slabs each enclosed by a jacket bonded thereto, the jacketed slabs being arranged side by side in edge-abutting relation to form a core. Outer skins are bonded to opposite sides of the core. Mounting inserts are potted in cavities in the core wherever required.

BACKGROUND OF INVENTION

The present invention relates in general to panel structures of the sandwich type comprising low density, rigid foam cores having high density facings on opposite sides thereof. Panel structures of the foregoing nature are equipped with mounting fittings and are used for a variety of purposes. For example, they are widely used in constructing enclosures, particularly airborne shelters, cargo containers, and the like.

SUMMARY AND OBJECTS OF INVENTION

Primary general objects of the invention are to provide a panel structure of the foregoing general type which is of simple construction, which achieves maximum strength with minimum weight, which is economical to manufacture, and the like.

More particularly, an important object of the invention is to provide a foam panel with simple potted mounting inserts wherever such inserts may be desired.

Another object of the invention is to provide a composite panel structure comprising low density slabs enclosed by jackets bonded thereto and arranged side by side in edge-abutting relation to form a core, the panel structure including outer skins bonded to opposite sides of the core.

With the foregoing construction, high strengths are achieved with no necessity for internal bracing of the core, which is an important feature of the invention.

Another object of the invention is to place reinforcing strips between the abutting edges of the slabs forming the core, the reinforcing strips being in planes perpendicular to the plane of the core. With this construction, the resulting panel is capable of withstanding exceptionally high bending loads, which is another important feature.

More particularly, an object in this connection is to provide a composite panel structure of the foregoing nature which permits locating a potted mounting insert intermediate the slab edges, or in abutting slab edges. In other words, with the present invention, a mounting insert may be located between the edges of a slab, or in the joint between adjacent slabs, which are important features.

The foregoing objects, advantages, features and results of the present invention, together with various other objects, advantages, features and results thereof which will be evident to those skilled in the art in the light of this disclosure, may be achieved with the exemplary embodiment of the invention described in detail hereinafter and illustrated in the accompanying drawing.

DESCRIPTION OF DRAWING

In the drawing:
FIG. 1 is a fragmentary perspective view of a panel structure which embodies the invention;
FIG. 2 is an enlarged, fragmentary sectional view taken as indicated by the arrowed line 2—2 of FIG. 1, and showing the panel structure in cross section prior to installing a mounting insert therein;
FIGS. 3, 4 and 5 are views similar to the left end of FIG. 2, but illustrating successive steps in the installation of a potted mounting insert; and
FIG. 6 is a fragmentary plan view taken as indicated by the arrowed line 6—6 of FIG. 5 of the drawing.

DESCRIPTION OF EXEMPLARY EMBODIMENT OF INVENTION

Referring to the drawing, designated generally therein by the numeral 10 is a composite panel or panel structure which embodies the invention. The panel 10 comprises a plurality of low density slabs 12 each enclosed by a jacket 14 bonded thereto, the jacketed slabs being arranged side by side in edge-abutting relation to form a core 16.

The slabs 12 may be formed of any suitable low density material, such as rigid foam, or the like. In the particular construction illustrated, the slabs 12 are shown as formed of synthetic rigid foam.

The jackets 14 preferably comprise a mesh fabric, and are preferably formed of a noncombustible material, such as fiber glass, nylon or even metal. The jackets 14 are wrapped around the slabs 12, preferably with overlaps along the slab edges, as shown in FIG. 2. Preferably, the jackets 14 are bonded to the slabs 12 with an epoxy adhesive, although other adhesives may be used.

Outer facings or skins 18 are bonded to opposite sides of the core 16 formed by the jacketed slabs 12, again preferably utilizing an epoxy adhesive. Preferably, the skins 18 are metallic, being formed of a lightweight metal such as aluminum.

By themselves, the rigid foam slabs 12 have low shear strengths. Consequently, cores of rigid foam are conventionally braced internally. By jacketing the slabs 12 in accordance with the present invention, internal bracing of the slabs is not necessary, which is an important feature of the invention.

If exceptionally high bending loads are to be applied to the panel 10, its strength in bending may be increased materially by bonding reinforcing strips 20, made of a material such as fiber glass or other non-conducting material, to the edges of the jacketed slabs 12 before bonding them together in edge-abutting relation, the reinforcing strips being located in planes perpendicular to the plane of the core 16. With this construction, the reinforcing strips 20, and the jacket overlaps thereadjacent, act as high density beams to reinforce the core 16 against bending loads, which is another important feature.

The panel 10 may be used as part of another structure, such as an airborne shelter, a cargo container, or the like. To permit securing another structure or structures to the panel 10, the latter is provided with mounting inserts wherever required to accommodate such other structure or structures. As will be described, such mounting inserts are potted in cavities in the core 16, and may be located anywhere in the core, i.e., between the edges of the slab 12, or even in the junctions of adjacent slabs. For example, FIGS. 1 and 2 illustrate two possible mounting insert locations 22 and 24. For convenience, installation of a mounting insert 26 in the location 22 only will be considered, it being understood that the same discussion applies to the location 24.

Considering the installation of the insert 26 in the location 22, the first step, as shown in FIG. 3, is to drill a hole 28 through one of the outer skins 18 into and through the underlying jacketed slab 12 to, but not through, the opposite outer skin. Next, as shown in FIG. 4, the hole 28 is undercut between the outer skins 18 to form an enlarged cavity 30. The foam and jacket fragments are removed from the cavity 30 by a suitable vacuum means, not shown.

Next, as shown in FIGS. 5 and 6, the cavity 30 is filled with a suitable potting material, which may comprise an epoxy mixture containing any desired low density filler material. After filling the cavity 30 with the potting material 32, the mounting insert 26, which is provided with coarse external threads 36, is screwed into the uncured potting material. The mounting insert 26, which is internally threaded, is supported at the proper level by a bolt 38 threaded into the insert and having its head seated on a large washer 40. The latter is made of a material like Teflon, or any other material which will not stick to the potting material 32. The washer 40 also precludes bonding of the potting material 32 to the bolt 38.

The mounting insert 26 and the washer 40 are provided with openings 42 and 44, respectively, through which any excess potting material may escape.

After the potting material has cured, the bolt 38 and the washer 40 are removed. The mounting insert 26 is then ready to receive a bolt, not shown, for securing some other structure to the panel 10.

To better secure the potting material 32 to the skin 18 opposite the insert 26, one or more screws 48 may be threaded through holes in such skin prior to potting, as shown in FIG. 5.

As previously explained, the same procedure is used to install a mounting insert, not shown, at the location 24, it being necessary in this case to cut through the overlapped jacket edges and the reinforcing strips 20.

Although an exemplary embodiment of the invention has been disclosed for purposes of illustration, it will be understood that various changes, modifications and substitutions may be incorporated in such embodiment without departing from the spirit of the invention as defined by the claims which follow.

I claim as my invention:

1. In a composite panel structure, the combination of:
   (a) low density rectilinear slabs, each enclosed by a two-piece jacket bonded thereto;
   (b) each said jacket being of single thicknesses along the two major surfaces of the slab and of double thickness along two opposite edge surfaces of the slab;
   (c) said jacketed slabs being arranged side-by-side in edge-abutting relation to form a core;
   (d) outer skins bonded to opposite sides of said core; and
   (e) at least one reinforcing strip between adjacent edges of each pair of adjacent jacketed slabs and in a plane perpendicular to the plane of said core.

References Cited

UNITED STATES PATENTS

| | | | |
|---|---|---|---|
| 1,956,354 | 4/1934 | Junkers | 52—378 X |
| 2,880,830 | 4/1959 | Rohe | 52—617 |
| 3,311,042 | 3/1967 | Severson | 49—477 |
| 3,510,916 | 5/1970 | Phelan | 52—617 |
| 3,544,417 | 12/1970 | Corzine | 161—39 |
| 3,560,316 | 2/1971 | Gill | 52—309 |

FOREIGN PATENTS

| | | | |
|---|---|---|---|
| 238,895 | 1962 | Australia | 161—161 |

OTHER REFERENCES

German printed application, No. 1,202,959, Rohe.

JOHN E. MURTAGH, Primary Examiner

U.S. Cl. X.R.

52—617; 161—40, 43, 69, 161